April 23, 1929.   F. P. HILLARD   1,710,419
GAS METER
Filed Jan. 12, 1926   2 Sheets-Sheet 1

INVENTOR.
Frank P. Hillard
BY Nestall and Waller
ATTORNEYS.

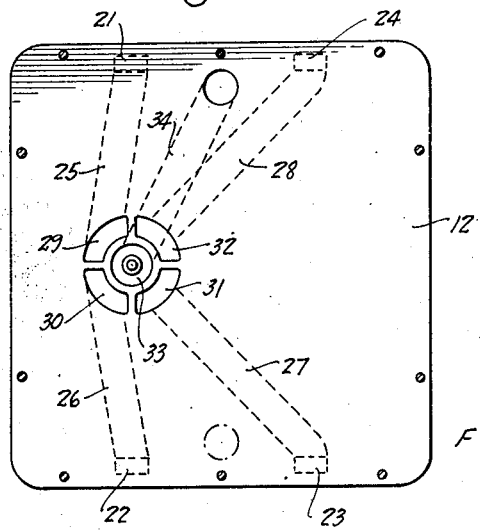
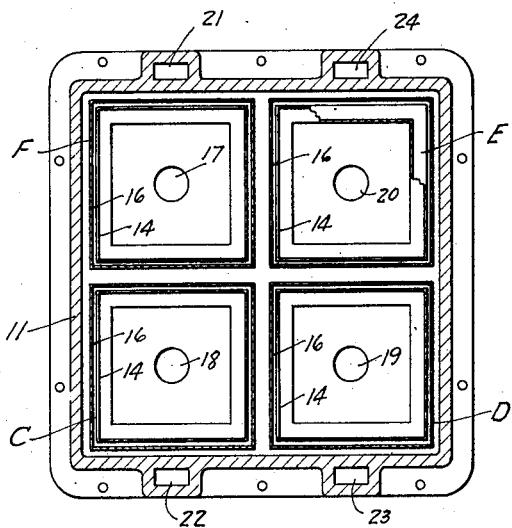
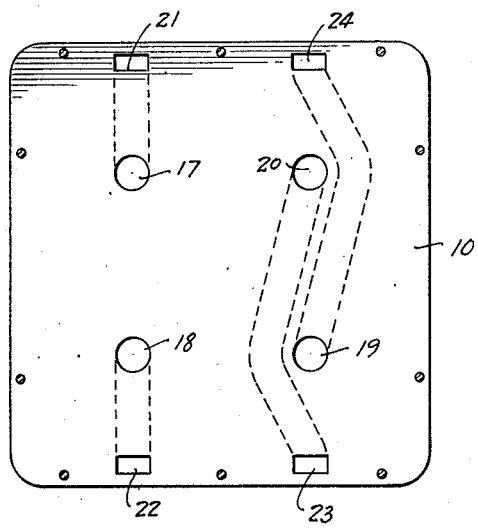
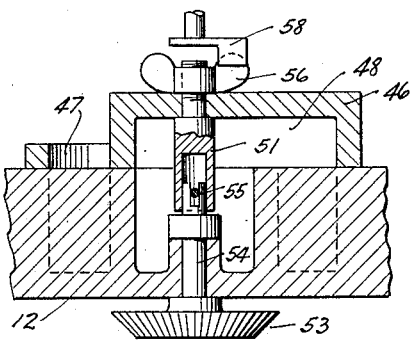
INVENTOR.
Frank P. Hillard

Patented Apr. 23, 1929.

1,710,419

UNITED STATES PATENT OFFICE.

FRANK P. HILLARD, OF PASADENA, CALIFORNIA.

GAS METER.

Application filed January 12, 1926. Serial No. 80,703.

This invention relates to a meter for measuring the volume of gas passing therethrough. The invention is especially adaptable to embodiment in a consumer's meter for measuring commerical and industrial gas.

Such meters must be so constructed as to require a minimum of energy to operate them, and must operate efficiently under low pressures. The meter structure must be long lived, require substantially no attention and be accurate. Such meters also must be economical, not easily tampered with, and compact. One essential of a consumer's meter is that it will pass a uniform and constant flow of gas so there will be no objectionable fluctuations in the consumer's line. Heretofore, the type of meter commonly used has included a diaphragm or bellows employing a flexible sheet. These sheets are commonly made of hide and sheepskin has been found to best serve the purpose. Such hides must be impermeable to gas and have a high degree of flexibility so as to insure proper functioning. Furthermore, they should have a comparatively long life without deterioration, especially being gas tight. Objections to sheepskin are obvious. Matters of economy and the difficulty of obtaining skins of requisite quality make desirable employment of meters not requiring skins. The present invention has for its primary object the provision of a meter having expansible chambers formed of substantial material. Other objects of this invention are to provide a meter of the character described which will pass a uniform and constant flow of gas, will retain its accuracy, require substantially no attention, be long lived, economical, gas tight, and not subject to fraudulent tampering.

Figure 1:
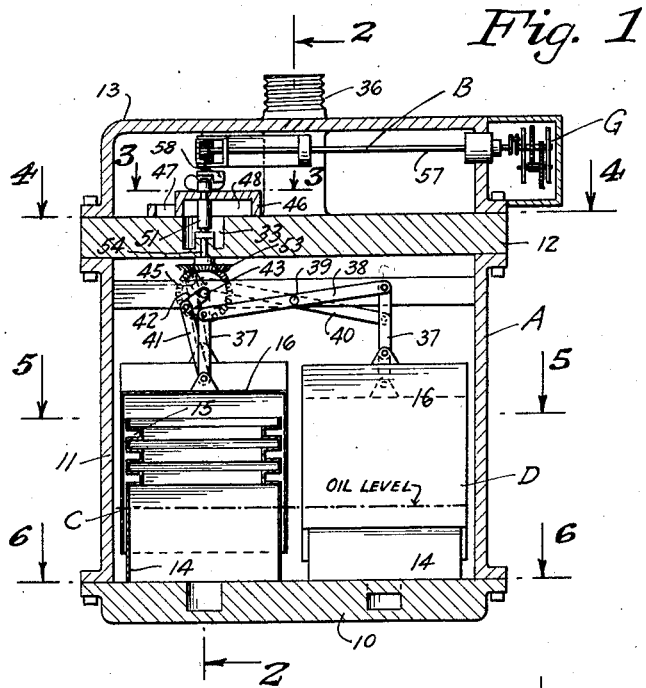
Figure 3:
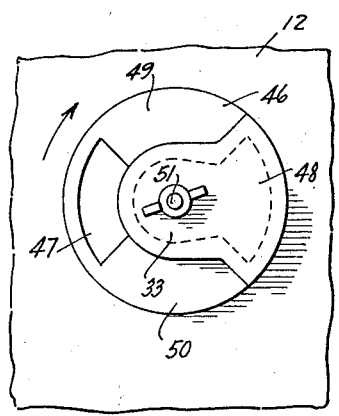
Figure 2:
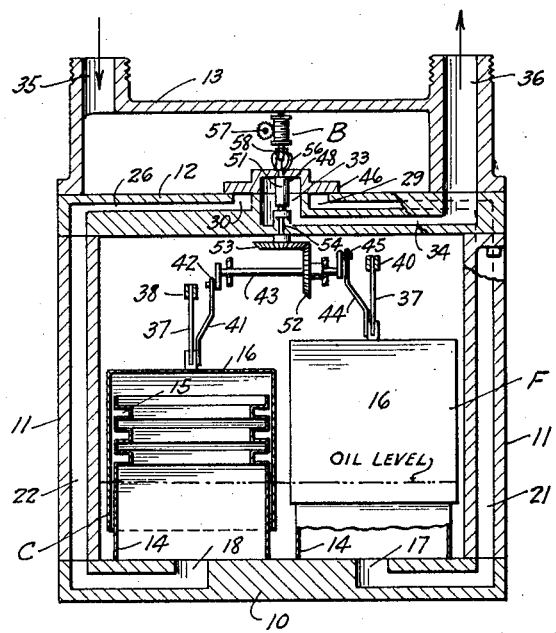

These objects together with other objects and corresponding accomplishments, are obtained by means of the embodiment of my invention illustrated in the accompanying drawings, in which:

Fig. 1 is a vertical section through a meter constructed in accordance with my invention; Fig. 2 is a section as seen on the line 2—2 of Fig. 1; Fig. 3 is a fragmentary view of the valve on an enlarged scale as seen upon the line 3—3 of Fig. 1; Fig. 4 is a section as seen upon the line 4—4 of Fig. 1; Fig. 5 is a section as seen upon the line 5—5 of Fig. 1; Fig. 6 is a section as seen upon the line 6—6 of Fig. 1; and Fig. 7 is a section through the valve.

Referring more particularly to the drawings, a meter is shown comprising a case A housing expansible chambers through which the gas passes. These chambers are connected by suitable operating mechanism to a train of index gears indicated generally by B. The specific details of the index mechanism are not pertinent to the present invention. There are various types of gearing, dials, and hands, which may be employed to indicate the amount or volume of gas which has passed through the meter. Since the index gearing is not pertinent to the present invention, it will not be further described.

The case A comprises a base 10 of sufficient thickness to include passages for four expansible chambers. The shell 11 may be formed in a unit which is so arranged that it may be conveniently secured to the base by bolts extending through flanges. The case is closed by a lid 12 having passages which register with the passages in the shell 11 and thereby communicate with the passages in the base 10. A cover 13 is mounted upon the lid and provides a gas inlet compartment and housing the index gearing and the valve.

The base is rectangular in plan and is divided into four sections. Each section has mounted thereon in fixed position in any suitable manner, a section 14 of a telescopic chamber. The section is open at the top and adjacent thereto is provided with grooves 15 to assist in providing oil seals. Slidably mounted over each section 14 is a section 16 closed at the top, thereby providing a telescopic chamber whose volume may be expanded and contracted. Opening into the chamber through the base 10 are ports 17, 18, 19 and 20. These ports communicate through passages in the base with passages 21, 22, 23 and 24 respectively, the latter passages being located in the shell. The shell passages lead to the lid having passages 25, 26, 27 and 28 communicating respectively with passages 21, 22, 23 and 24. Passages 25, 26, 27 and 28 open through ports 29, 30, 31 and 32 in the upper face of the lid 12. These last mentioned ports are arranged in a circle forming equal sectors thereof. At their center is a round port 33 communicating with a passage 34 in the lid 12. The passage 34 opens to the upper face of the lid 12 at one side and is connected to port 33.

Cover 13 is arranged to seat upon the lid 12 and form a tight fit therewith so as to provide a chamber housing the index gearing. This chamber also provides for the supply of gas to the valve ports and is hereafter termed the inlet chamber. A tubular extension 35 communicates with the chamber and provides for connection thereto of the street or supply line. In the opposite side of the cover a passage is formed to fit tight to the outlet port of and for registration with the passage 34. This passage and the tubular extension therefor is indicated by 36, and is arranged to be connected to the house service line. Gas passing from the street service will enter the meter, pass therethrough and out to the house service line through passage 36.

Each of the sections 16 of the expansible chambers have ears at the top or other suitable means for pivotally securing thereto connecting links 37. The links secured to the chambers indicated generally by C and D are joined by a rocker lever 38 pivotally mounted upon a shaft 39. Similarly the links secured to chambers E and F are connected by a rocker 40. In this manner, the expansible chambers are tied together in pairs so that the members of a pair must expand and contract alternately. Inflowing gas pressure expands one chamber, the expanding chamber acting by means of the rocker to contract the opposite chamber of the pair. Connecting rod 41 secures the movable portion of chamber C to a crank 42 mounted upon a shaft 43. Similarly the movable portion of expansible chamber F is secured to a connecting rod 44 to a crank 45 mounted upon shaft 43. Cranks 42 and 45 are disposed at ninety degrees to each other. The chambers are thus linked together so that they are ninety degrees apart in a cycle. Thus, suppose that chamber C is fully contracted, chamber F is approaching full contraction and would be the next chamber to reach contraction after chamber C. Chamber D has reached full expansion, and further movement will be toward contraction. Chamber E is moving toward full expansion. The cycle of expansion is in the order of C, F, D, E. The valve ports, connecting with chambers C, F, D and E should follow consecutively in the same order. To produce such an arrangement of ports, the passages from ports 19 and 20 pass one another, as shown in Fig. 6. Referring to Fig. 4, it will be noticed that progression around the circle of the port openings is in the order of the passages connecting with chambers C, F, D and E.

A rotary valve is employed to effect consecutive communication of the expansion chamber valve ports with the inlet chamber and with the discharge outlet to the center port 33. The valve whereby communication is effected is shown more particularly in Figs. 3 and 7 It comprises a disk closed upon the top except for a section 47 corresponding to one of the valve chamber ports. Opposite to the opening 47 is a corresponding recess 48 leading to the center for communication with the outlet valve port 33. Sectors 49 and 50 are diametrically opposite and of such extent that they may close corresponding ports. The rotary valve is turned about a stem 51. The direction of movement will be that shown by the arrow in Fig. 3. When the opening 47 is in complete registration with port 30 the latter is in complete communication with the inlet chamber and chamber C is one half expanded; chamber D is one half contracted; chamber E is completely expanded; and chamber F is completely contracted. At the same time valve chamber port 32 is in complete registration with the recess 48 in the valve, and chamber D is in complete communication with the discharge. The movement of the chambers is such that chamber C is one half expanded and continues to expand. Opening 47 immediately begins to uncover port 29. Chamber F will begin to expand and gas will be supplied thereto from opening 47. Both chambers C and F will be taking in gas. When opening 47 has moved out of registration with port 30 and sector 50 has covered it, chamber C will have fully expanded. It will be noted that the opening 47 connects at times two of the chambers to the inlet gradually closing one port and opening the other. In the same manner the discharge opening 48 will connect one chamber to the discharge and then the next one, the two adjacent ones being connected for a part of the time to the discharge. When opening 47 is in complete registration with port 30, port 32 will be in complete registration with recess 48 and connected to the discharge. This means the connection of chamber D with the discharge. Recess 48 next moves so as to gradually connect port 31 with the discharge and thus gradually connect chamber E with the discharge. When chambers C and F are taking in gas, chambers E and D are discharging gas.

Means is provided for rotating the valve and also for operating the index. Mounted upon shaft 43 is a bevel pinion 52. This pinion meshes with a pinion 53 secured to a shaft 54 journaled in the lid. Shaft 54 has a notch extending diametrically across the end thereof. The valve stem 51 is hollow so that it will slip over shaft 54. Extending across the end of the stem 51 is a pin 55 arranged to drop into the notch in shaft 54. A wing nut 56 secures the valve to stem 51. The arrangement is such that the rotary valve may be lifted from the lid and removed. Reciprocation of the expansible chambers will cause the shaft 43 to be rotated and shaft 54 to be correspondingly moved through the intermediate gears. This causes a rotation of the valve and the placing of the expansion chambers in communication with the inlet and discharge in their proper order. Each contraction and expansion of a chamber will be a measure of a given volume of gas passing through the meter. To record the number of contractions and expansions, a train of index gearing is provided. At the front of the meter may be a dial or set of dials and hands moving thereover in the manner well known in consumer's gas meters. Such a mechanism is indicated generally by G. A shaft 57 communicates motion to the index gears. This shaft is journaled in the cover and is connected through suitable gears with a flag 58 rotating about a vertical axis. This flag is arranged to be engaged by a wing of the nut 56 and thereby caused to revolve with the valve. In this manner the valve and the expansion chambers are geared to the index mechanism. The structure is also such that the cover may be removed with convenience.

The case A is filled with oil to a level higher than the lower end of the members 16 of the expansion chambers when the latter are raised. Oil will pass between members 14 and 16, thereby providing an effective seal.

What I claim is:

1. A meter comprising a closed casing, four telescopical chambers therein, each of said chambers comprising a section fixed to the bottom of said casing and a movable section telescoping therewith, two rockers, one being secured to two of the movable sections of said chambers so as to cause the latter to operate alternately in pairs, a shaft, cranks on said shaft, a connection from a crank to a chamber of each pair, said cranks being disposed at ninety degrees to one another, said casing being provided with a passage for each chamber leading through said casing and opening through valve ports, said casing having an inlet for gas and a discharge, valve means for progressively placing said valve ports in communication with said inlet and outlet, said valve means being operated by said shaft.

2. A meter comprising a closed casing, four telescopical chambers therein, each of said chambers comprising a section fixed to the bottom of said chamber and a movable section telescoping therewith, a liquid in said chamber to seal said sections, two rockers, each rocker being secured to two movable sections joining a pair so as to constrain the latter to alternate reciprocation, a shaft, two cranks on said shaft disposed at ninety degrees to one another, a connection from each of said cranks to a pair of said chambers, said casing being provided with a passage for each chamber leading through said casing and opening through valve ports arranged in a circle, said casing having an inlet chamber and an outlet passage having a discharge port concentric to said valve port, a rotary valve having passages for cooperation with said ports and inlet whereby said valve ports may be progressively placed in communication with said inlet at discharge port and means for rotating said valve operated from said shaft.

In witness that I claim the foregoing I have hereunto subscribed my name this 30th day of December, 1925.

FRANK P. HILLARD.